United States Patent

[11] 3,560,657

[72] Inventors Paul L. Stone
Meadowbrook, Pa.;
Paul J. Dever, Cherry Hill, N.J.

[21] Appl. No. 742,672
[22] Filed July 5, 1968
[45] Patented Feb. 2, 1971
[73] Assignee Electro-Nite Company
Philadelphia, Pa.
a corporation of Pennsylvania

[54] AUTOMATIC WARNING SYSTEM
1 Claim, 1 Drawing Fig.

[52] U.S. Cl. .................................................... 179/5
[51] Int. Cl. .................................................... H04m 11/04
[50] Field of Search .......................................... 179/5, 5P

[56] References Cited

UNITED STATES PATENTS 3,207,850 9/1965 Foreman ..................... 179/5
3,461,241 8/1969 Menke ........................ 179/5

*Primary Examiner*—Kathleen H. Claffy
*Assistant Examiner*—Douglas W. Olms
*Attorney*—Seidel and Gonda

ABSTRACT: An automatic warning system responds to a warning signal energized by an outside agency by closing a switch which permits a power supply to energize the motor on a tape deck, the tape deck generates a plurality of single frequency pulses which are rectified and used to energize an electronic switch that provides data to a coupling mechanism and dials a remote telephone. After the telephone is dialed, the tape deck broadcasts a voice signal and then a further series of single frequency pulses that resets the system and dials a second number or the same number. The switch is then opened and the system turned off.

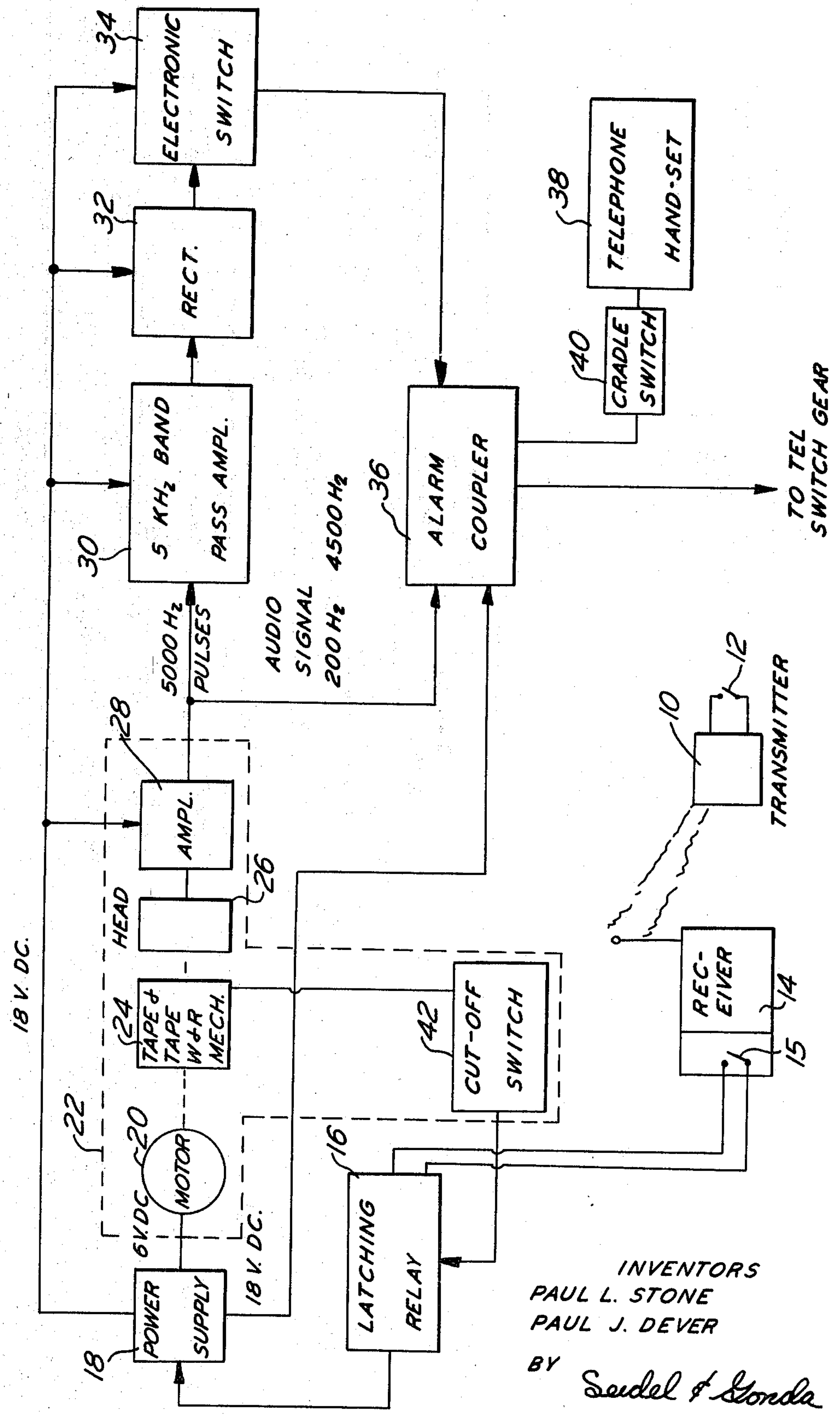
INVENTORS
PAUL L. STONE
PAUL J. DEVER
BY Seidel & Gonda
ATTORNEYS

AUTOMATIC WARNING SYSTEM

This invention relates to an automatic warning system. More particularly, this invention relates to an automatic warning system that couples into a standard telephone system to ring a remote telephone and broadcast a message into the receiver of the remote telephone.

The present invention provides a new and unobvious method for providing universal alarm and warning systems that will ring remote telephones. Burglar, fire and equipment alarm systems which merely trigger an alarm at the location are inadequate because there may be times and situations where no person is present to answer the alarm. Other types of alarm systems that automatically dial a local telephone then broadcast a message are cumbersome and expensive because of the complicated mechanisms required for lifting the receiver and dialing the phone. Another type of alarm system involves a direct line to a remote station such as a fire house or a police station. The difficulty with this type of system is that it necessitates renting and tying up a complete line which presumably would be used only in emergency situations.

The present invention overcomes the foregoing difficulties by providing an inexpensive and relatively simplified alarm system that automatically energizes a remote telephone only when the alarm is tripped. There is presently available for rent or otherwise from the Bell Telephone System a coupler device that when energized will couple the alarm system into the telephone system. The present invention provides an alarm system that will energize the coupler, dial a remote telephone and then broadcast an appropriate message when the remote telephone has been energized. The alarm coupler, however, is not a necessary part of the alarm system. It is incorporated because it is required by the Bell Telephone Company, but with obvious modification the system can be connected directly to a telephone line.

For the purpose of illustrating the invention, there is shown in the drawings a form which is presently preferred; it being understood, however, that this invention is not limited to the precise arrangements and instrumentalities shown.

The drawing shows a schematic diagram of the automatic warning system described herein.

Referring now to the drawing in detail, wherein like numerals indicate like elements, there is shown a schematic block diagram of an automatic warning system in accordance with the present invention.

A transmitter 10 is rendered operable to broadcast a signal of any desired frequency by closing the switch 12. Switch 12 represents any form of alarm trip device. The switch 12 can be operable upon the breaking of a window, the overheating of a machine, the sensing of a fire, or any of the myriad of trip devices normally provided in alarm systems. Although schematically shown as a manually operable switch, it can also be electronic as for example a sound operated switch. The signal generated by the transmitter 10 is detected by a centrally located receiver 14 which detects and amplifies the radio signal. The receiver is preferably positioned in the same cabinet with the automatic warning system. The receiver 14 closes switch 15 when energized by transmitter 10. Switch 15 is connected to a latching relay 16 which closes and latches when switch 15 is momentarily closed.

Latching relay 16 is connected to the power supply 18 and controls the same. Power supply 18 is energized by a conventional source of available current (not shown). The output of power supply 18 is an 18 volt direct current which is used to provide power for the remaining portions of the electronic apparatus and a 6 volt direct current which is used to drive the motor 20. Upon energization of the power supply 18, the motor 20 begins to turn and the remaining portions of the circuit are energized. Motor 20 forms a part of a device for transducing recorded information into an electronic signal which may take the form of a tape deck 22. Tape deck 22 consists of motor 20, a capstan drive and a removable tape cartridge 24, a tape head 26, an amplifier 28 and cutoff switch 42.

The motor 20 drives the capstan which drives a tape in the cartridge 24 past the tape head 26. The information contained on the tape is transduced into electronic signals and amplified by the amplifier 28. The output of amplifier 28 is connected to a band pass amplifier 30 which in turn is connected through rectifier 32 to the electronic switch 34. The amplifier 28 is also directly connected to the alarm coupler 36. In addition, the electronic switch 34 is connected to the alarm coupler 36. Alarm coupler 36 is an interface device provided by the telephone company. The output of alarm coupler 36 is connected directly to the telephone switch gear as indicated generally by the arrow.

A conventional telephone handset 38 is shown tied to the telephone switch gear through the alarm coupler. Thus, telephone handset 38 may be used in its ordinary manner. In addition, it can be lifted to listen to the message on the tape 24. Thus, if it is desired to test the system, then the cradle switch 40 can be opened by lifting the receiver. Thereafter the audio message can be played and overheard. Lifting the telephone handset before the dialing pulses are completed shorts them out so the remote telephone is not dialed, but the message can be heard in the handset.

The tape cartridge 24 is in contact with cutoff switch 42 which in turn is connected to the latching relay 16. Cutoff switch 42 is used to remove latching relay 16 from the line thereby turning the system completely off. Switch 42 is preferably a metal foil on the tape 24 which shorts across two contacts. This shorts latching relay 16 and hence turns off power supply 18.

The automatic warning system operates in the following manner.

The transmitter 10 broadcasts a signal when energized by closing the switch 12. This signal is received by receiver 14 which amplifies it and applies it to relay operated switch 15. Latching relay 16 latches closed and thereby switches on the power supply 18. The 18 volt direct current output of power supply 18 energizes amplifier 28, band pass amplifier 30, rectifier 32, electronic switch 34 and alarm coupler 36. The 6 volt direct current output of power supply 18 also energizes motor 20 which drives the capstan and cartridge 24. The tape in mechanism 24 is driven past the head 26 which transduces the information stored on the tape into electronic signals. The tape is preferably the center feed-outside wind type. Therefore, rewinding is never required.

In accordance with the present invention, the information contained on the tape consists of a series of 5,000 Hz pulses followed by a voice frequency message such as the name and address of the premises where the system is located and some information as to the condition for which the system is providing a warning. In the preferred embodiment, this message is repeated twice. Thereafter, the cutoff switch 42 open latching relay 16 thereby removing the power supply 18 from the system. This completely turns off the system.

The 5,000 Hz. pulses taken from amplifier 28 are passed through the 5,000 Hz. band pass amplifier 30. Band pass amplifier 30 eliminates signals in the voice frequency range. The 5,000 Hz. pulses are rectified by rectifier 32 and applied directly to electronic switch 34. Electronic switch 34 may be any conventional type of switch such as a transistor switch which is saturated by the direct current pulses from rectifier 32. Electronic switch 34 is normally open when it is not energized by power supply 18. As soon as latching relay 16 energizes power supply 18, the electronic switch 34 closes, and remains closed so long as the only energy supplied to it is taken from power supply 18. The closing of electronic switch 34 energizes alarm coupler 36.

Electronic switch 34 remains closed a sufficient amount of time for obtaining a dial tone, sometimes called line seizure. Thereafter, a series of 5,000 Hz. pulses on the tape 24 are transduced by the head 26 and amplified by the amplifier 28. Then these pulses pass through the band pass amplifier 30 and rectifier 32 and are applied to the electronic switch 34. Their effect is to cause the electronic switch 34 to open momentarily. The opening and closing of electronic switch 34 is the equivalent of dialing a conventional telephone which also is nothing more than the opening and closing of a switch a predetermined number of times for each number dialed. After the number has been dialed by generating and transmitting the correct series of 5,000 Hz. pulses, a sufficient amount of time is allowed for the remote telephone to ring and be answered. Thereafter, the voice frequency message is broadcast from amplifier 28 through the alarm coupler 36.

As indicated above, the message is normally broadcast twice to be certain that the listener receives the complete message. Thereafter, the cutoff switch 42 can be operated by passing a foil on the tape 24 across a pair of shorting posts. However, in another embodiment of this invention, a 5,000 Hz. pulse can be generated for a sufficient amount of time to disconnect the alarm system from the remote telephone by holding the electronic switch 34 open. This is the same as depressing the cradle switch on a conventional telephone in order to disconnect a remote line and redial. Thereafter, a new series of 5,000 Hz. pulses can be generated and used to dial either the same telephone number or a different telephone number. The purpose in redialing the same telephone number is to avoid the consequences of a busy signal at the remote telephone. If desired, the second set of 5,000 Hz. pulses could dial the owner of the establishment after having first dialed the public authorities such as the police or fire house. The dialing of a second number by broadcasting a 5,000 Hz. pulse would be distinguished from operating the cutoff switch 42. Operating the latter removes the latching relay 16 and turns off the system until such time as the transmitter 10 again operates. The use of a 5,000 Hz. pulse keeps the system on to permit a second number to be dialed.

Although the present system is described as using two successively dialed numbers in order to avoid the consequences on a busy signal, it is also possible to solve the problem by connecting a second switch in series with the cutoff switch 42. This switch would be located between the cutoff switch 42 and the latching relay 16 and connected to the alarm coupler 36. It would be a normally closed switch that opens only upon detecting signals at the same frequency as the busy signal on a telephone line. If the cutoff switch 42 should then be closed, it will have no effect on latching relay 16 which will then continue to hold the alarm system in operation. Thereafter, the correct series of pulses can again be generated to dial the number once again. This procedure will continue until such time as a busy signal is not received.

The tape head 26 can be single channel or multiple channel. If it is multiple channel, then the cartridge 24 can be prerecorded with parallel channels associated with each channel of the tape head 26. Each channel could be used to provide a different emergency warning signal such as police, fire, or equipment breakdown. When multiple channels are used, then the system is modified to energize the channel head corresponding to the particular emergency about which the system is to warn. If desired, multiple single channel heads 26 can be used in place of multichannel tape heads.

The present invention may be embodied in other specific forms without departing from the spirit or essential attributes thereof and, accordingly, reference should be made to the appended claims, rather than to the foregoing specification as indicating the scope of the invention.

We claim:

1. An automatic warning system to be connected to a telephone system comprising a coupling means for connecting said system to said warning system; first means for generating first signal in response to a predetermined condition; means for receiving said first signal, said receiving means being operative to generate an alarm output signal; second means for generating a control signal and a message signal, said control signal being a plurality of single pulses corresponding to a predetermined telephone number, all of said pulses having the same frequency, said message signal being at audio frequencies; a band pass filter connected to said second means, said filter being operative to separate said control signal from said message signal; a dialing control switch responsive to said pulses, means for connecting said dialing control switch to said coupling means, said dialing control switch being operative to signal a predetermined telephone in response to said pulses of said control signal; means for connecting said separated message signal to said coupling means; a normally deenergized power supply, said power supply being selectively energizable in response to said alarm output of said receiving means to energize a group of means comprising said second means, said band pass filter, said dialing control switch and said coupling means; a normally open latching relay interposed between said receiving means and said power supply; a cutoff switch intermediate said second means and said normally open latching relay, said latching relay being operative to complete a circuit and energize said power supply in response to said output signal from said receiving means so that said group of means is energized; and said cutoff switch is operative to open said latching relay and deenergize said power supply and said group of means at the conclusion of a message signal.